United States Patent [19]
Park

[11] Patent Number: 5,970,101
[45] Date of Patent: Oct. 19, 1999

[54] PHASE DETECTING METHOD BY ANALOG-TO-DIGITAL CONVERSION

[75] Inventor: Hyun-Jeong Park, Suwon, Rep. of Korea

[73] Assignee: Samsung Electronics Co., Ltd., Rep. of Korea

[21] Appl. No.: 08/879,231

[22] Filed: Jun. 18, 1997

[30] Foreign Application Priority Data

Sep. 6, 1996 [KR] Rep. of Korea ............ 96-38720

[51] Int. Cl.⁶ .................. H03D 3/22; H04L 27/22
[52] U.S. Cl. .................. 375/329; 375/279; 329/304
[58] Field of Search .................. 375/324, 325, 375/326, 327, 342, 355, 373, 375, 376, 377, 282, 242, 279, 280, 329, 332; 364/721; 341/111, 126, 155, 899; 329/304

[56] References Cited

U.S. PATENT DOCUMENTS 4,169,246  9/1979  Schriber et al. ............ 325/320
4,231,094  10/1980  Desblache ............ 364/514
4,506,333  3/1985  Porrot et al. ............ 364/487
4,575,709  3/1986  Tomlinson ............ 340/347
5,202,766  4/1993  Mehrgardt et al. ............ 358/198
5,521,499  5/1996  Goldenberg et al. ............ 327/237
5,530,720  6/1996  Marguinaud ............ 375/232

Primary Examiner—Chi H. Pham
Assistant Examiner—Jean B Corrielus
Attorney, Agent, or Firm—Dilworth & Barrese

[57] ABSTRACT

A method of detecting a phase associated with a sinusoidal signal over a period associated with the sinusoidal signal, the method comprising the steps of: sampling the sinusoidal signal at a prescribed sampling frequency every period thereby generating a plurality of sampling values; converting the plurality of sampling values to a plurality of digital values; respectively evaluating said plurality of digital values within a first period and a latter period associated with the period of the sinusoidal signal, the evaluation of each period generating respective resulting digital values; and determining the phase associated with the sinusoidal signal according to the resulting digital values of the first period and the latter period.

11 Claims, 3 Drawing Sheets

PHASE DETECTING METHOD BY ANALOG-TO-DIGITAL CONVERSION

BACKGROUND OF THE INVENTION

1. Field of the Invention

The present invention relates to phase detecting methods, and more particularly to phase detecting methods for detecting BPSK (binary phase shift keying) modulated data by analog-to-digital conversion.

2. Description of the Prior Art

Generally, it is known that various types of data signals may be superimposed on a television broadcasting signal prior to the television broadcasting signal being transmitted. Such information signals may include analog television signals as well as a variety of digital data signals, for example, teletext, time code, caption data, etc. In the case of digital data, there are a variety of methods for superimposing the data signal on the broadcasting signal. Such modulation techniques may include, for example, FSK (frequency shift keying), BPSK (binary phase shift keying), NRZ (nonreturn to zero) or PSK (phase shift keying). The digitally modulated broadcasting signal is then transmitted as an analog signal. A receiver receives this analog signal and demodulates the received analog signal in order to extract the corresponding digital data. In the demodulating process, it is important that the data be accurately extracted.

SUMMARY OF THE INVENTION

It is an object of the present invention to provide a phase detecting method for extracting digital data by analog-to-digital conversion of a BPSK modulated sinusoidal signal.

According to one aspect of the present invention, a method of detecting a phase associated with a sinusoidal signal over a period associated with the sinusoidal signal comprises the steps of: sampling the sinusoidal signal at a prescribed sampling frequency thereby generating a plurality of sampling values; converting the plurality of sampling values to a plurality of digital values; respectively evaluating said plurality of digital values within a first period and a latter period associated with the period of the sinusoidal signal, the evaluation of each period generating respective resulting digital values; and determining the phase associated with the sinusoidal signal according to the resulting digital values of the first period and the latter period.

BRIEF DESCRIPTION OF THE DRAWINGS

The above objects, and other features and advantages of the present invention will become more apparent by describing the preferred embodiment thereof with reference to the accompanying drawings, in which.

DETAILED DESCRIPTION OF PREFERRED EMBODIMENT

Figure 1:
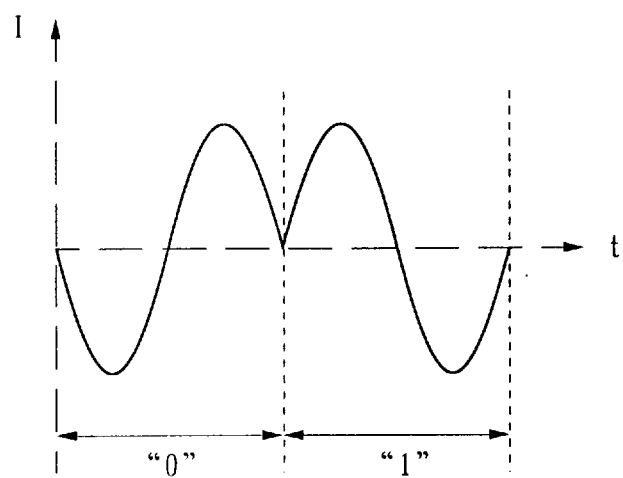
FIG. 1 is a graph illustrating a waveform of BPSK modulated data.

FIG. 1 shows a waveform of a BPSK modulated signal which may be received by a receiver adapted to implement the teachings provided herein. As is known in BPSK modulation and as shown in FIG. 1, a sinusoidal signal phase-shifted by 180° typically corresponds to digital data having a binary value of "0", and a sinusoidal signal phase-shifted by 0° typically corresponds to digital data having a binary value of "1". That is, the digital data "0" and "1" are modulating data corresponding to phase-shifted values 180° and 0° of the sinusoidal signal, respectively. In terms of a sinusoidal broadcasting signal being modulated by the digital data, it is to be understood that digital data having a binary value of "0" imposes a 180° phase shift on the sinusoidal broadcasting signal and digital data having a binary value of "1" imposes a 0° phase shift on the sinusoidal broadcasting signal. Of course, it is to be understood that an alternative correspondence may be employed in which a 0° phase shift implies digital data "0" and a 180° phase shift implies digital data "1". Nonetheless, a receiver extracts the corresponding digital data by detecting the phase associated with the sinusoidal signal.

Figure 4:
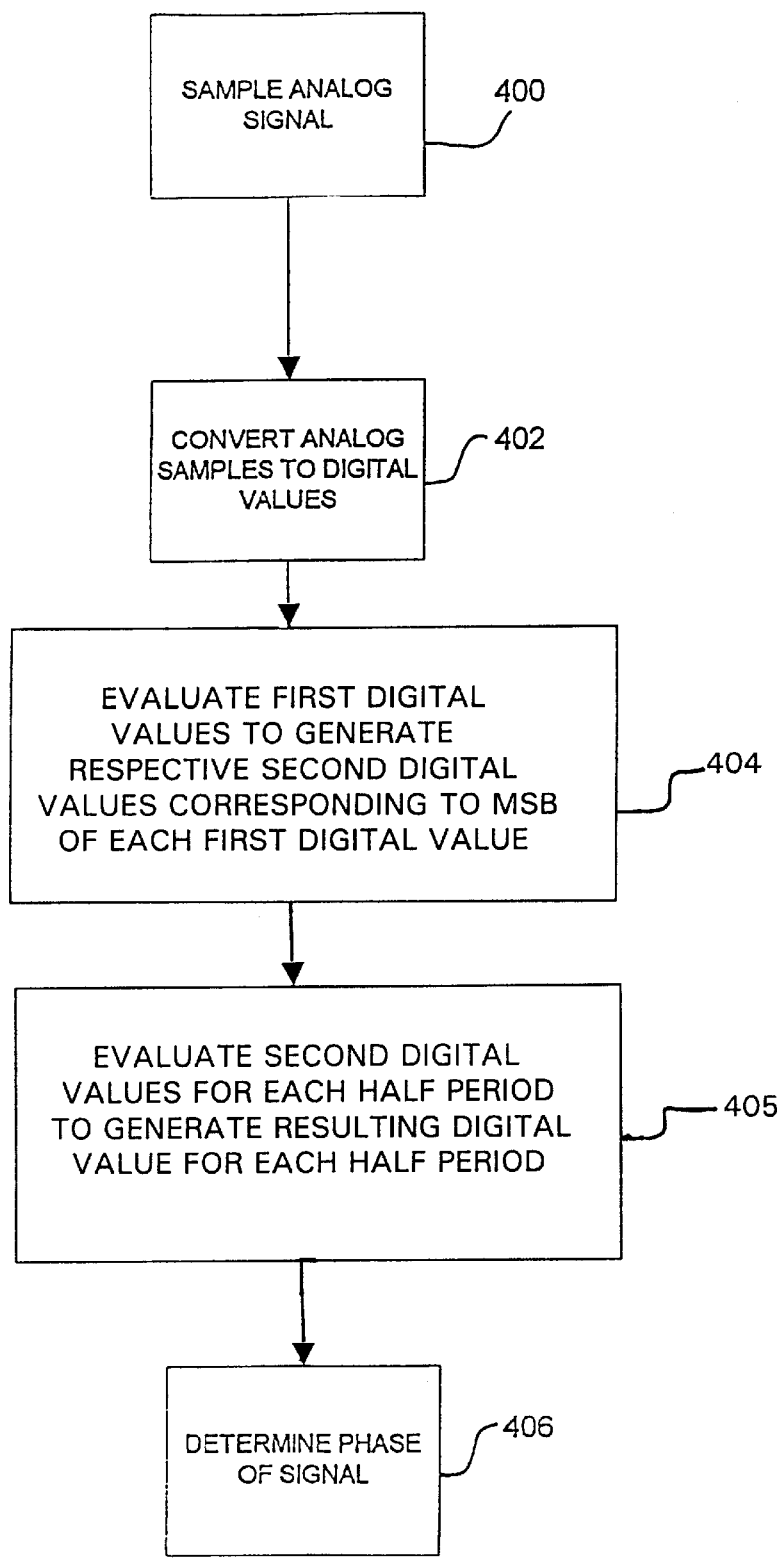
FIG. 4 is a flow chart illustrating a phase detection method in accordance with the present invention.

In accordance with the present invention, in order to detect phase information associated with a BPSK modulated signal, a receiver is adapted for sampling an analog input signal (FIG. 4, Step 400) (e.g., sinusoidal broadcasting signal) at a predetermined sampling rate over a particular sample period and for converting the signal into digital data (Step 402) via analog-to-digital conversion. In a preferred embodiment, the sampling rate is 8 samples per sample period and the analog-to-digital conversion has an output resolution of 2 bits. Of course, other sampling frequencies and/or analog-to-digital conversion bit resolutions may be employed to implement the present invention. It is to be appreciated that, given the novel teachings of the present invention described herein, one of ordinary skill in the art will be able to implement sampling and analog-to-digital conversion circuitry in order to practice the invention.

Figure 2:
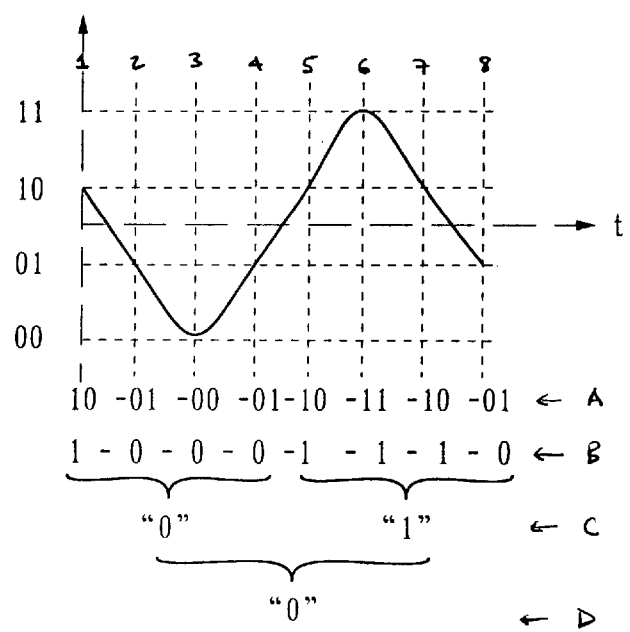
FIG. 2 is a graph illustrating one aspect of a phase detecting method according to the present invention.
Figure 3:
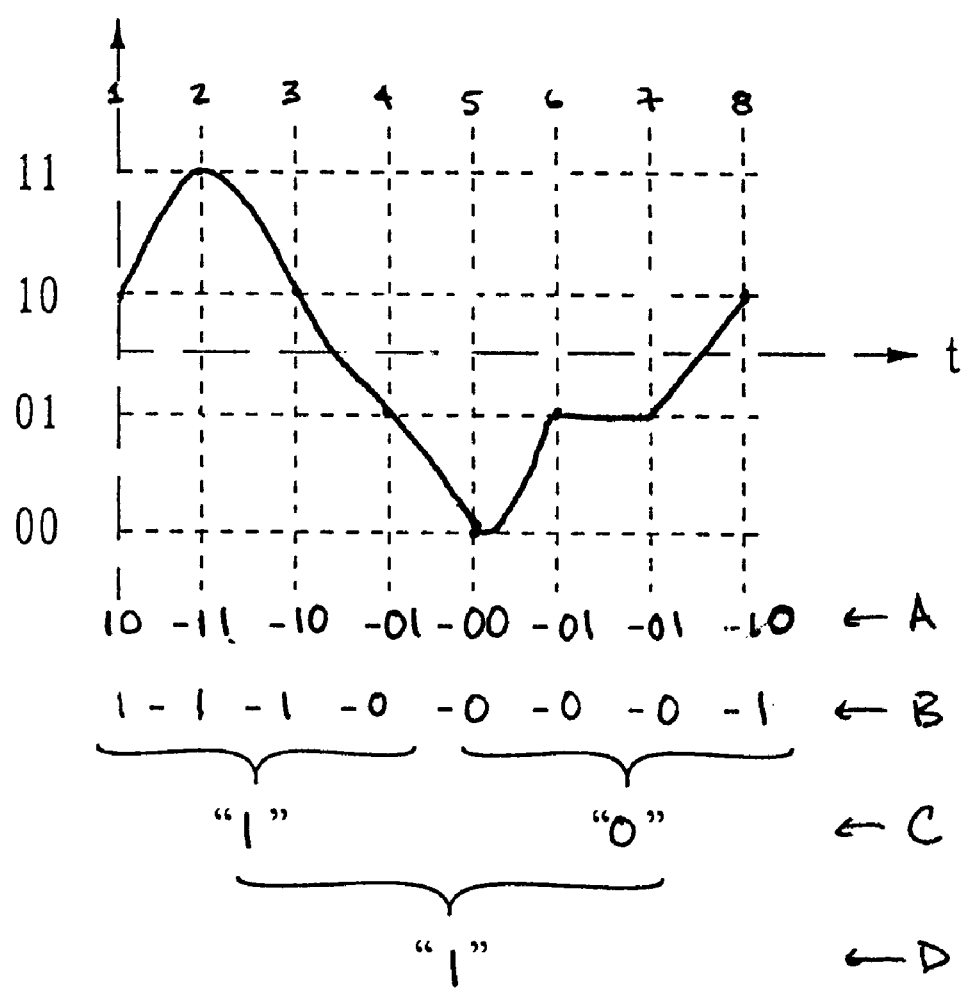
FIG. 3 is a graph illustrating another aspect of a phase detecting method according to the present invention.

Referring to FIGS. 2 and 3, a preferred method of implementing the present invention will now be explained. FIG. 2 illustrates a 180° phase-shifted sinusoidal signal and a preferred method for sampling and converting the signal in accordance with the invention. It is to be appreciated that the sample period substantially corresponds with the period of the received sinusoidal signal. Particularly, the sinusoidal input signal is sampled and converted such that the following binary 2-bit correspondence for each sample is obtained: sample 1=10; sample 2=01; sample 3=00; sample 4=01; sample 5=10; sample 6=11; sample 7=10; and sample 8=01. Such corresponding binary 2-bit values are seen in FIG. 2 along the horizontal axis as 10 -01 -00 -01 -10 -11 -10 -01 and denoted as line A. Of course, the vertical axis defines the four possible bit combinations of a 2-bit analog-to-digital conversion (00, 01, 10, 11).

For evaluation, the obtained data is divided into data associated with a first half period (e.g., including samples 1 through 4) and data associated with a latter half period (e.g., including samples 5 through 8). The 2-bit data (first digital values) for each sample is then evaluated (Step 404) such that when the most significant (leftmost) bit (MSB) is "0", the data for each sample is assigned or processed as a binary value of "0" (second digital value). When the MSB is "1", then the data for each sample is assigned or processed as a binary value of "1" (another second digital value). This evaluation is denoted at line B of FIG. 2. Therefore, data 10 - 01 - 00 - 01 of the first half period obtains evaluated values 1 - 0 - 0 - 0. Next, (Step 405 if the number of "0" values among the evaluated values is 3 or more, then data of the corresponding half period is processed as "0", as shown at line C of FIG. 2. In a similar way, since the latter half period is evaluated as having values 1 - 1 - 1 - 0 (line B), the entire data associated with the latter half period is processed as "1" (line C). Next, if a processing result of the first half period is "0" and a processing result of the latter half period is "1", thereby combining as a value of 01 with an MSB of "0", the input sinusoidal signal for the subject sample period is determined to be the 180° phase-shifted signal which results in the extraction of a digital data value of 0 for that sample period.

Referring now to FIG. 3, in a 0° phase-shifted sinusoidal signal, the sinusoidal input signal is sampled and converted such that the following binary 2-bit correspondence for each sample is obtained: sample 1=10; sample 2=11; sample 3=10; sample 4=01; sample 5=00; sample 6=01; sample 7=01; and sample 8=10. Such corresponding binary 2-bit values are seen in FIG. 3 along the horizontal axis as 10 -11 -10 -01 -00 -01 -01 -10 and denoted as line A. As with the 180° phase-shifted sinusoidal signal, the obtained data is divided for evaluation into data associated with a first half period and data associated with a latter half period. In accordance with the MSB of the data for each sample as explained above, data 10 - 11 - 10 - 01 of the first half period has evaluated values 1 - 1 - 1 - 0. This assignment is denoted at line B of FIG. 3. Next, if the number of "1" values among the evaluated values is 3 or more, then data of the corresponding half period is processed as "1", as shown at line C of FIG. 3. In a similar way, since the latter half period is evaluated as having values 0 - 0 - 0 - 1 (line B), the entire data associated with the latter half period is processed as "0" (line C). Next, if a processing result of the latter half period is "1" and a processing result of the first half period is "0", thereby combining as a value of 10 with an MSB of "1", the input sinusoidal signal for the subject sample period is determined to be the 0° phase-shifted signal which results in the extraction of a digital data value of 1 for that sample period (Step 406).

Thus, a sinusoidal input signal may be sampled and converted as explained above such that the resulting evaluated binary value will indicate the phase of the sinusoidal input signal for the given period and, as a result, the desired digital information is easily and accurately extracted. Further, as illustrated above, since a phase-shifted relation is detected by data obtained by digitally converting the BPSK modulated sinusoidal signal, phase detection can be digitally processed. Consequently, the phase can be accurately detected according to a given sampling frequency and processed, for example, by software within a microprocessor of a television receiver.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of detecting a phase associated with a sinusoidal signal over a period associated with the sinusoidal signal, the method comprising the steps of:

sampling the sinusoidal signal at a prescribed sampling frequency thereby generating a plurality of sampling values;

converting the plurality of sampling values to a plurality of digital values;

respectively evaluating said plurality of digital values within a first half period and a latter half period of said period of the sinusoidal signal, the evaluation of each half period generating respective resulting digital values; and determining the phase associated with the sinusoidal signal according to the resulting digital values of the first half period and the latter half period;

wherein, said sampling frequency is about eight times greater than a frequency associated with the sinusoidal signal;

there are four digital values associated with the first half period and four digital values associated with the latter half period;

the plurality of digital values are each represented by two bits thereby having a possible value of 00, 01, 10 and 11; and, wherein one of said first half period and said latter half period is evaluated as a value 0 when the number of digital values having a value of 01 and 00 among the four digital values is at least three and is evaluated as a value 1 when the number of digital values having a value of 10 and 11 among the four digital values is at least three.

2. The method as claimed in claim 1, wherein said phase of said sinusoidal signal is determined to be about 0° when the evaluated value of the first period is 1 and the evaluated value of the latter period is 0.

3. The method as claimed in claim 1, wherein said phase of said sinusoidal signal is determined to be about 180° when the evaluated value of the first period is 0 and the evaluated value of the latter period is 1.

4. A method of detecting a phase associated with a sinusoidal signal over a period associated with the sinusoidal signal, the method comprising the steps of:

sampling the sinusoidal signal at a prescribed sampling frequency thereby generating a plurality of sampling values;

converting the plurality of sampling values to a plurality of first digital values;

respectively evaluating said plurality of first digital values within a first half period and a latter half period associated with the period of the sinusoidal signal, the evaluation of each half period generating respective second digital values, each second digital value respectively corresponding to a most significant digit of each first digital value;

evaluating said second digital values for each half period thereby generating a resulting digital value for each half period;

determining the phase associated with the sinusoidal signal according to the resulting digital values of the first period and the latter period.

5. The method as claimed in claim 4, wherein said sampling frequency is about eight times greater than a frequency associated with the sinusoidal signal.

6. The method as claimed in claim 5, wherein there are four first digital values associated with the first half period and four first digital values associated with the latter half period.

7. The method as claimed in claim 6, wherein the first digital values are each represented by two bits thereby having a possible value of 00, 01, 10, and 11.

8. The method as claimed in claim 7, wherein the second digital values are each represented by one bit thereby having a possible value of 0 and 1.

9. The method as claimed in claim 8, wherein one of said first period and said latter period is evaluated as a resulting value 0 when the number of second digital values having a value of 0 among the four second digital values is at least three and is evaluated as a resulting value 1 when the number of second digital values having a value of 1 among the four second digital values is at least three.

10. The method as claimed in claim 9, wherein said phase of said sinusoidal signal is determined to be about 0° when the resulting value of the first half period is 1 and the resulting value of the latter half period is 0.

11. The method as claimed in claim 9, wherein said phase of said sinusoidal signal is determined to be about 180° when the resulting value of the first half period is 0 and the resulting value of the latter half period is 1.

\* \* \* \* \*